United States Patent

[11] 3,592,271

| [72] | Inventor | Fred J. Schneider |
| | | Box 940, Eston, Saskatchewan, Canada |
| [21] | Appl. No. | 809,577 |
| [22] | Filed | Mar. 24, 1969 |
| [45] | Patented | July 13, 1971 |

[54] IMPLEMENT DRAWBAR ASSEMBLY
20 Claims, 14 Drawing Figs.

[52] U.S. Cl. ................................................. 172/175,
172/383, 172/488, 172/620, 172/629, 172/776
[51] Int. Cl. ...................................................... A01b 49/02,
A01b 23/04, A01b 35/04
[50] Field of Search .......................................... 172/178,
174, 175, 776, 178, 170, 180, 195, 310, 669, 671,
629, 488, 311, 677, 456, 248, 383, 620

[56] References Cited
UNITED STATES PATENTS

| 1,422,967 | 7/1922 | Griswold et al. | 172/175 X |
| 2,828,597 | 4/1958 | Moore | 172/311 X |
| 2,889,890 | 6/1959 | Bronleewe | 172/776 X |
| 3,155,168 | 11/1964 | Telecky | 172/776 X |
| 3,169,027 | 2/1965 | Oerman | 172/456 X |
| 3,177,828 | 4/1965 | Cramer | 172/677 X |
| 3,177,830 | 4/1965 | Zimmerman | 172/176 X |
| 3,262,505 | 7/1966 | Brakhage | 172/456 |
| 3,333,645 | 8/1967 | Gustafson | 172/456 |

*Primary Examiner*—Robert E. Pulfrey
*Assistant Examiner*—Stephen C. Pellegrino
*Attorney*—Kent & Ade

ABSTRACT: An implement drawbar having one set of soil treating implements on the front and a second set of different implements on the rear, with castor wheels supporting the front and the second set of implements supporting the rear. The rear set is mounted for movement around a vertical pivot and two horizontal pivots at right angles to one another and means to lift the first set of implements clear of the frame are provided to allow the machine to be moved to the transport position without having to disconnect any of the implements.

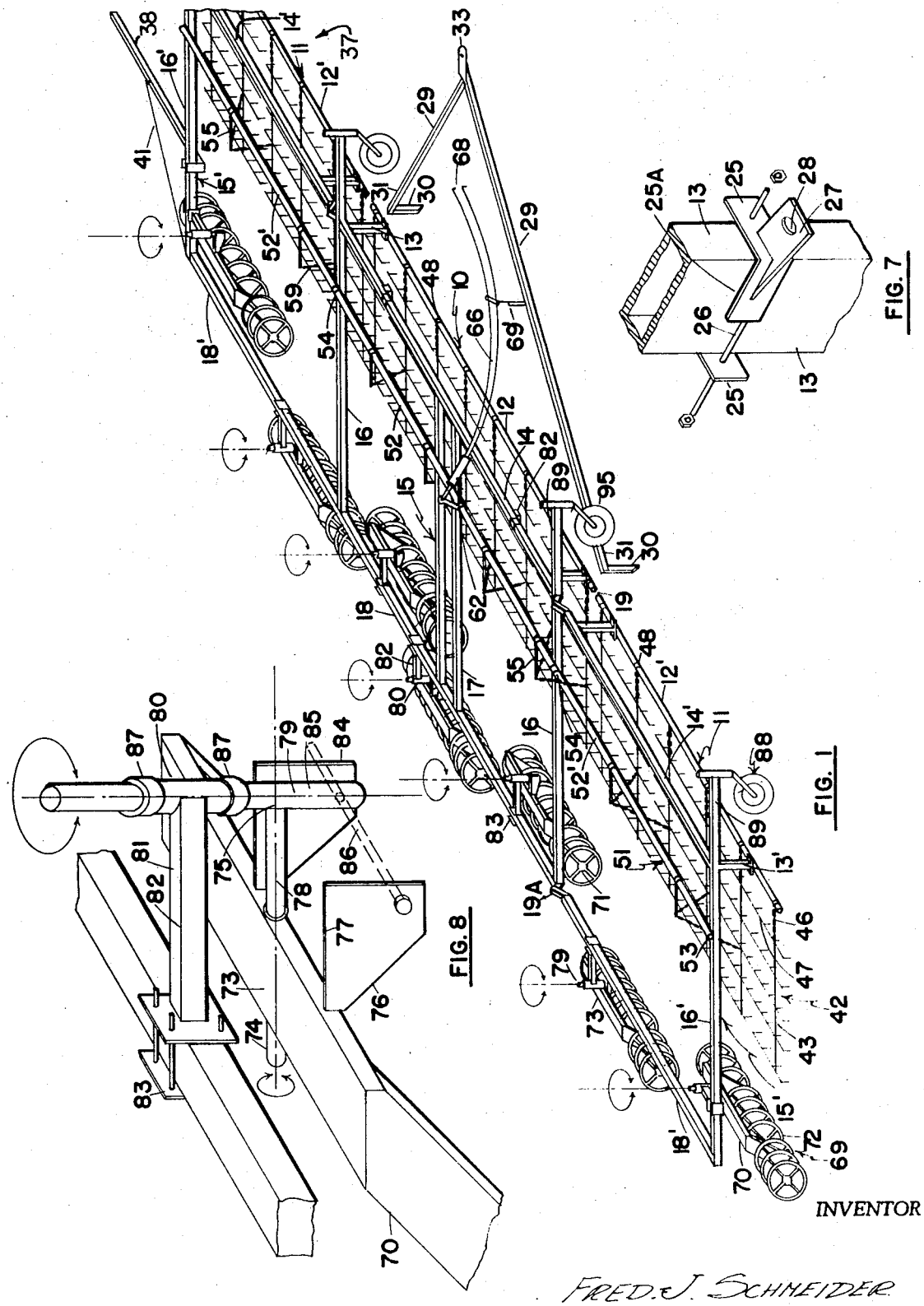

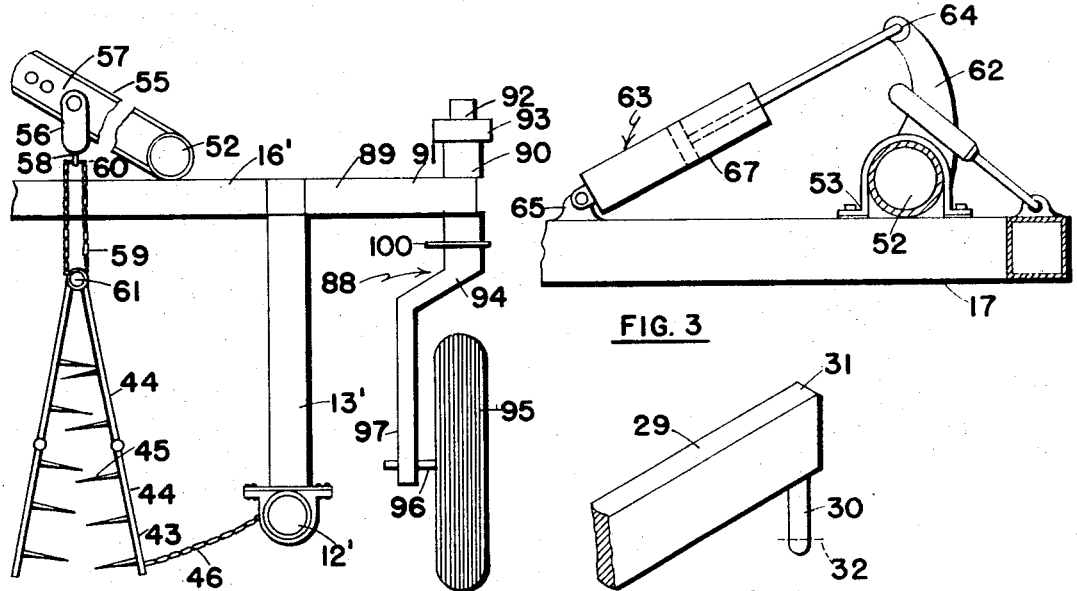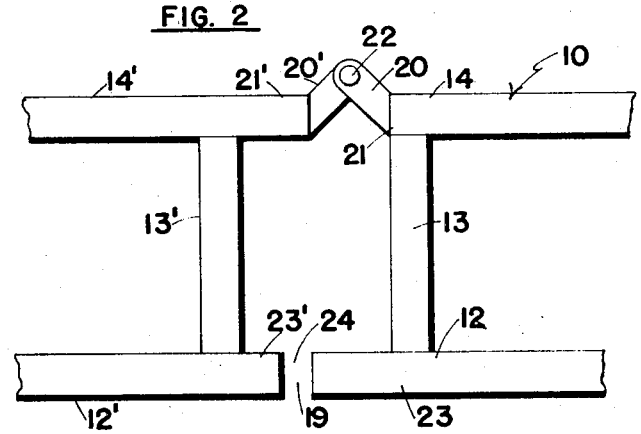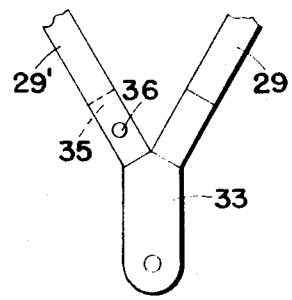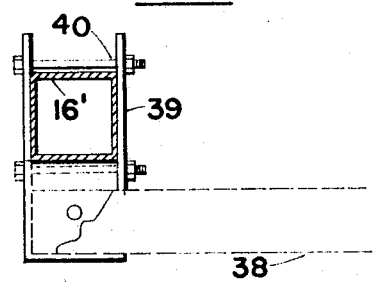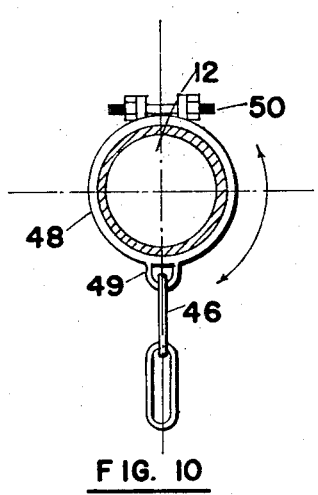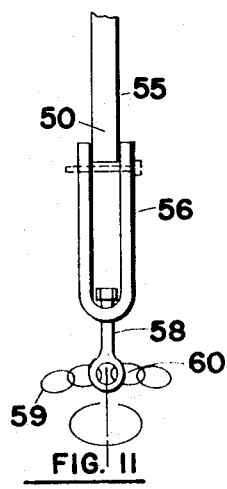

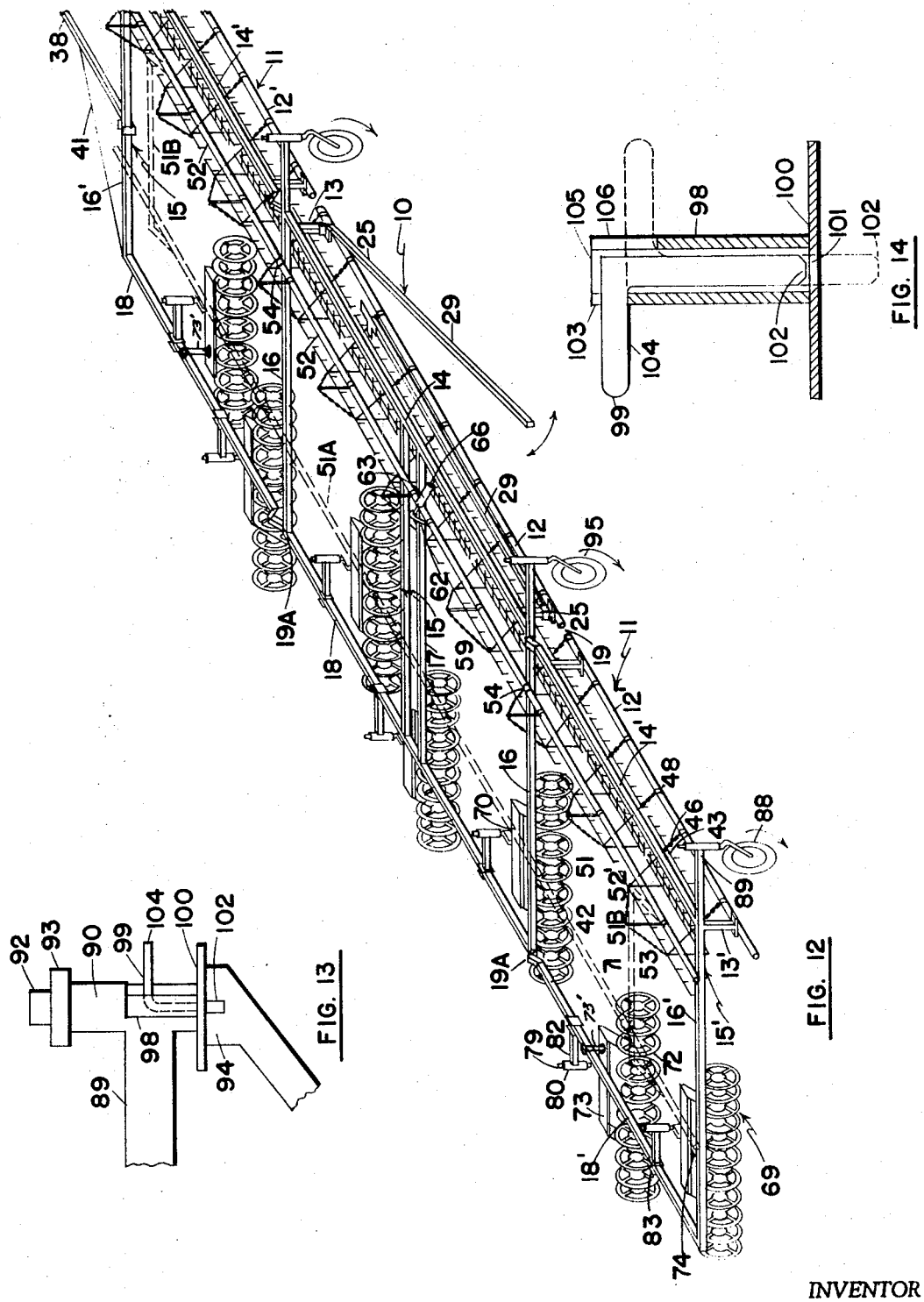

IMPLEMENT DRAWBAR ASSEMBLY

This invention relates to new and useful improvements in implement drawbar assemblies and is specifically designed so that two sets of soil-treating implements may be actuated at the same time.

In the present description and drawings, the two sets of soil-treating implements include a plurality of harrow sections and land-packing devices.

However, it will be appreciated that any combination of such soil-treating implements can be utilized such as rod weeders, cultivators, discing sections and the like.

One of the principle objects and essence of the invention is to provide a drawbar capable of pulling first soil-treating implements such as harrow drawbars which in turn can be raised or lowered relative to the ground by hydraulic means, together with second soil-treating implements behind the first implements which can pivot in a variety of planes in order to ensure constant contact with the ground.

Another object of the invention is to provide a device of the character herewithin described in which the first set of soil-treating implements can be elevated whereupon the assembly can be moved in transport position at right angles to the normal direction of travel, the second set of implements castoring automatically and supporting the rear side of the implement.

Another object of the invention is to provide a device of the character herewithin described which can be used as a single implement or, alternatively, can have a plurality of wing sections attached thereto in articulated relationship.

A yet further object of the invention is to provide a device of the character herewithin described which includes a novel mounting for the second set of implements permitting movement in a vertical plane and in two horizontal planes at right angles to one another.

A still further object of the invention is to provide a device of the character herewithin described which facilitates the treatment of soil by permitting two individual treatments to be accomplished at one time.

Summarizing, the assembly consists of a drawbar member adapted to pull such implements as harrow sections and having means superposed above the drawbar to raise and lower these sections as required.

Castor wheel support the front end of the assembly and second soil-treating implements support the rear side and may take the form of land which: or the like.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying FIGURES in which:

FIG. 1 is an isometric view of the invention.

FIG. 2 is a fragmentary end elevation of the front side of the device with the first implements in the raised position.

FIG. 3 is a fragmentary partially sectioned view of one portion of the frame showing the rocker shaft and the hydraulic raising and lower means.

FIG. 4 is a fragmentary isometric view of the inner end of one of the hitch members.

FIG. 5 is a fragmentary isometric view of the hitch point of the hitch members.

FIG. 6 is a fragmentary partially sectioned view showing the attachment of the transport hitch.

FIG. 7 is a fragmentary isometric view showing the attaching end of the inner end of the hitch members.

FIG. 8 is a fragmentary isometric view showing the mounting of the second soil-treating implements to the frame.

FIG. 9 is a fragmentary front elevation showing the connection between the center section and one of the wing sections.

FIG. 10 is a fragmentary cross-sectional view showing the attachment of the first implement to the drawbar member.

FIG. 11 is a front elevation showing the attachment of the first implement to the lifting arm.

FIG. 12 is an isometric view of the device in the transport position.

FIG. 13 is a fragmentary view of a portion of the castoring wheel with the lock of FIG. 14 incorporated.

FIG. 14 is an enlarged cross-sectional view of the locking means for the castor wheels.

In the drawings like characters of reference indicate corresponding parts in the different figures.

Proceeding therefore to describe the invention in detail, reference character 10 generally illustrates the center section and reference character 11, the wing sections situated upon either side of the center section.

Inasmuch as the structure of the center section and wing section is quite similar, dash numbers have been given to corresponding parts of the wing sections.

The sections each include a substantially tubular transversely situated drawbar member 12, 12'. Vertical support pivot pin 22 is positioned so that the gap or spaces 24 between the adjacent ends 23 and 23' is staggered with respect to the pivot pin means 22. This helps to prevent any engagement of the ends during flexing and if this type of construction was not utilized, a relatively large gap would have to be left between the ends which would interfere with the securement of the first soil-treating implements which will be described later on in the specification.

Referring back to the center section 10, the vertical posts 13 are situated adjacent the ends 23 of the implement drawbar member 12. A clamp 25A is secured to each of the members consisting of a pair of angulated portions 25 being secured around the posts 13 by means of bolt and nut assemblies 26. An offstanding plate 27 is welded to the front member 25 and is apertured as at 28.

A pair of hitch members 29 are provided said hitch members having a cylindrical shaft or pin 30 secured as by welding to the inner ends 31 and extending downwardly therefrom. These pins or shafts engaging within apertures 28 (FIG. 7) of the clamps 25A thus mounting the hitch members to the assembly, it being understood that a conventional clevis pin 32 may extend through the lower end of the pins or shafts 30 to prevent displacement.

One of these hitch members 29 is provided with a hitch plate 33 welded to the opposite end 34 thereof, said hitch plate having an offset portion 35 which receives the other hitch member specifically designated 29' and is secured thereto by means of pin 36 as shown in FIG. 5. The hitch members 29 and 29' therefor converge to a common hitch point whereby the implement may be secured to a source of pulling power such as a tractor in the usual manner.

However, these hitch members are easily detached and stored on the frame of the center section within brackets 82 on the upper center section member 14, when it is desired to move the assembly in the transport position in the direction of arrow 37 (See FIG. 1) which is at right angles to the normal direction of motion.

A towing bar member 38 is provided and is clamped around the end members 16' of either of the wing sections depending upon which direction it is desired to tow the assembly. FIG. 6 shows details of this clamp which includes the pair of opposite plates 39 bolted around the member 16' by means of nut and bolt assemblies 40 thus giving some adjustment to the position of the hitch member 38. A brace rod 41 extends between the member 38 and one end of frame member 16' to add stability to this portion of the assembly.

A first set of soil-treating implements collectively designated 42 are pulled by the implement drawbar members 12 and 12'. In the accompanying drawings, this first set of soil-treating implements takes the form of harrow sections 43 which are conventional in construction and are shown in FIG. 2. They consist of a plurality of articulated frames 44 having soil-engaging prongs or points 45 extending downwardly therefrom. Chains 46 extend between the front harrow members 47 and the implement drawbar members 12 and 12 and the securement of these chains to the drawbar members is shown in FIG. 10. A cylindrical clamp 48 surrounds the drawbar members 12 and 12 and a lug 49 permits attachment of the chain 46. A bolt and nut assembly 50 clamps the clamp around the member 12 and this clamp arrangement permits rotation of the clamp around the member thus shortening or lengthening and raising or lowering the chains 46 within limits which gives some adjustment so that different types of harrow sections may be used. Furthermore the clamps 48 are adjustable lengthwise along the drawbar members 12 and 12, once again facilitating the attachment of different types of harrow drawbar sections or the like.

Means are provided to raise and lower these first implement sections relative to the ground said means taking the form of a rockshaft collectively designated 51. This rockshaft consists of a center section 52 and wing sections 52' and these rockshaft sections are journaled within bearings 53 (see FIG. 3) secured to the side members 16 and 16' of the superposed frames. The rockshaft sections are connected together by means of universal joints 54 which are conventional in construction.

The rockshaft 51 may be situated to lift either the front or rear soil-treating implements or both. This may be accomplished by adding a further rockshaft 51A (see FIG. 12), and connecting the two rockshafts together either with links 51B or, of course, by providing one or more hydraulic rams (not illustrated).

Lift arms 55 are secured to the rockshaft sections 52 and extend rearwardly therefrom. Clevises 56 (shown in FIG. 11) are secured to the distal ends 57 of the rockshafts and a swivel pin 58 engages through the clevices. Lengths of chain 59 are secured to an eye 60 within the swivel pins 58 and these chains extend to the center crossmembers 61 (See FIG. 2) of the sections.

An actuating arm 62 (see FIG. 3) is secured to one of the rockshaft sections preferably the rockshaft section on the center section 10 and an hydraulic piston and cylinder assembly 63 is pivotally secured between the end 64 of the actuating arm and an anchor point 65 on the superposed frame as shown in FIG. 3. Hydraulic fluid conduits 66 extend from the cylinder 67, towards the hitch point 33 and terminate in quick connect and disconnect couplings 68 which are conventional. This permits the hoses to be connected to a source of hydraulic power (not illustrated) on the towing means. Spring-loaded supports 69 extending upwardly from one of the hitch members 29, hold these hoses clear of any interference and permitting the folding of the hitch or road transport without disconnecting the hoses from the drawbar.

Operation of the piston and cylinder assembly 63 causes the rockshaft sections to rotate thus raising or lowering the lift arm 55 and hence raising or lowering the harrow sections clear of the ground or lowering them into engagement with the ground as desired.

Second soil-treating implements are provided and in this embodiment take the form of land packer assemblies collectively designated 69. In the present embodiment, there are three such sections secured to the center section with a pair of such sections secured to the rear of each of the wing sections.

These assemblies are staggered forwardly and rearwardly of the rear members 18 and 18' as clearly shown in FIG. 1.

The construction of these assemblies is identical so that similar numbers have been given.

Each assembly consists of a yoke or fork 70 through which a spindle or axle 71 is journaled for rotation, said axle or spindle carrying a plurality of land packer wheel elements 72 for rotation thereon.

The horizontal member 73 of the yoke 70 (see FIG. 8) is provided with a horizontal pin or shaft 74 extending therethrough and extending forwardly to the end 75 thereof.

A pair of offset members in the form of triangular plates 76 are welded by the upper edges 77 thereof to the portion 78 of the shaft 74 and these members extend downwardly as indicated and also extend beyond the end 75 of the shaft. A vertical shaft 79 is journaled for rotation within a vertical bearing 80 which in turn is secured to the distal end 81 of a horizontal support member 82 secured by clamp assembly 83 to the rear member 18 and 18' of the superposed frames.

The ends 84 of the members 76 engage each side of the lower portion 85 of the vertical spindle 79 and are pivotally connected to adjacent the lower end thereof by means of pivot pin 86. Collars 87 are secured to vertical shafts 79 above and below bearing 80 and provided limited vertical adjustment of the shaft and hence the second implement 69, relative to the assembly.

This arrangement hereinbefore described permits the yoke and hence the second soil-treating implements 69 to rotate in a vertical plane around spindle 79, to pivot around horizontal spindle 74 at right angles to spindle 79 and also to hinge or pivot around the pin 86 connecting the yoke to the shaft 79. However, it will be appreciated that the end 75 of sh.ft 74 abuts against the shaft 79 above the pivot 86 thus limiting the upward movement of the yoke with relation to the framework. However, if the assembly is pulled across ground which drops away, the land-packing implement can hinge downwardly around pin 86 thus following the contour of the land and maintaining the packing action. The horizontal pivot or spindle 74 allows the soil-treating implements 69 to pivot due to uneven ground and the vertical pivot 79 permits the assemblies to swing into transport position as it provides a castoring action.

The front of the assembly is supported by a plurality of castor wheel assemblies collectively designated 88. One is provided upon each end of the center section and one upon the outer ends of each wing section. The members 16 and 16' extend forwardly of the front members 14 and 14' and these extensions are numbered 89 and 89' respectively.

It will of course be appreciated that castor wheels can also be secured to the frame 18 in a manner similar to the soil packers and in place thereof, in the event that other soil-treating implements are connected to the device which require some support. In other words, soil-treating implements which cannot take the full weight of the implement such as the soil packers can.

The castor wheel assemblies include vertical bearings 90 secured to the ends 91 of the extensions 89 and 89' and a spindle 92 is journaled for rotation within this bearing, being secured within the bearing by means of collar 93 of the upper end thereof.

A fork element 94 extends downwardly from spindle 92 and a ground-engaging wheel 95 is journaled for rotation upon spindle 96 secured to the lower end 97 of the fork element 94.

Means are provided to lock one or more of these castor wheels in the transport position in order to prevent the rear end of the implement from wandering and FIGS. 13 and 14 show details of this means.

A vertically situated tube 98 is secured to one side of the bearing 90 and an angulated pin 99 slides vertically within this tube or sleeve 98.

A disc or plate 100 is secured to the spindle 92 adjacent the lower end thereof just above the fork element 94 and this disc is apertured as at 101.

The lower end 102 of pin 99 is adapted to engage aperture 101 when the castor wheel assembly is in the transport position thus preventing rotation of the spindle 92 within bearing 90.

A pin raised slot 103 is provided within one sidewall of the tube 98 and the angulated end 104 of the pin 99 rests within this slot when the lower end 102 of the pin is in the raised position and thus clear of the aperture 101.

However, if the pin is raised clear of the upper end 105 of the tube and then rotated so that the angulated portion 104 engages a pin lowered slot 106 also in the wall of the tube, then the lower end 102 of the pin is permitted to enter aperture 101 thus locking the assembly.

In operation, various soil-treating implements may be pulled by the drawbar members 12 and 12' and various other soil-treating implements may be mounted upon the yoke 70 or directly to support members 82 or to the frame members 18.

Referring back to the clamp 25A shown in FIG. 7, it will of course be appreciated that this can be welded directly to the posts 13 in the event that vertical adjustment of this clamp is not required.

It should also be noted that the implement can be pulled in the transport position from either end depending upon circumstances.

Finally, it will also be appreciated that mounting arms 82 can be secured to any portion of the frame such as to parts 14 or 16 or 18 in order to mount either soil-treating implements such as the packer assemblies 69 illustrated or castor wheels or any other form of soil-treating implement.

When it is desired to transport the machine, the first soil-treating implements 42 are raised by the hydraulic piston and cylinder assembly 63 whereupon the implement may be towed at right angles to the normal direction of motion or in the direction of arrow 37. The castor wheels and the second soil-treating implements castor thus permitting the implement to be transported. If necessary, one or more of the second soil-treating implements may be locked in the transport position by means of a pin 73' extending through the rear frame member 18' and the horizontal portions 73 of the yoke.

What I claim to be the present invention is:

1. An implement drawbar assembly which includes first soil-treating implements and second soil-treating members, said assembly comprising in combination a transversely extending drawbar member, hitch members detachably secured by one end thereof to adjacent opposite ends of said drawbar member, said hitch members converging to a common apex and forming a hitch point for a source of pulling power, means for connecting a plurality of first soil-treating implements behind said drawbar member, a superposed frame above said drawbar member and extending rearwardly therefrom, post members secured to said drawbar member and extending upwardly to adjacent the front side of said superposed frame and being connected thereto, castor wheel means extending from said frame to support the front side thereof and said drawbar member, means on said superposed frame to raise and lower said first soil-treating implements relative to the ground, and means mounting second soil-treating members on the rear side of said superposed frame, said means mounting said second soil-treating implements including a horizontal arm clamped to the rear of said superposed frame for longitudinal adjustment therealong, a vertical spindle journaled for rotation in the distal end of said arm, and intimate mounting yoke, a horizontal spindle upon which said yoke is mounted for movement therearound, and means mounting said horizontal spindle to the lower end of said vertical spindle for hinging action thereby mounting said yoke and said second soil-treating implement for movement around a vertical axis, a first horizontal axis and a second horizontal axis at right angles to said first horizontal axis, said means mounting said horizontal spindle to said vertical spindle including a pair of offset members secured to and extending downwardly from said horizontal spindle, said members being pivotally secured to the lower end of said vertical spindle, one end of said horizontal spindle abutting against said vertical spindle vertically above said pivotal securement thereby limiting the hinging action of said yoke in the upward direction only.

2. The assembly according to claim 1 in which said means to raise and lower said first soil-treating implements relative to the ground includes a rock shaft journaled for rotation on said superposed frame and extending parallel to said implement drawbar member, an hydraulic piston and cylinder assembly operatively connected between said rock shaft and said superposed frame, implement lift arms secured to and extending from said rock shaft and flexible means connecting said first soil-treating implements to the distal ends of said lift arms.

3. The assembly according to claim 1 in which said superposed frame is substantially rectangular when viewed in plan, said second soil-treating implement being mounted on the rear frame member of said rectangular frame said supporting said superposed frame at the rear thereof.

4. The assembly according to claim 2 in which said superposed frame is substantially rectangular when viewed in plan, said second soil-treating implement being mounted on the rear frame member of said rectangular frame and supporting said superposed frame at the rear thereof.

5. The assembly according to claim 1 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and a pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.

6. The assembly according to claim 2 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and a pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.

7. The assembly according to claim 3 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.

8. The assembly according to claim 4 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said type, a pin raised slot in the walls of said tube and a pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.

9. An implement drawbar assembly which includes first soil-treating members and second soil-treating members, said assembly comprising in combination a center section and at least one wing section on each side thereof, means to connect said wing section to said center section in articulated relationship, said center section and said wing section each including a transversely extending drawbar member, hitch members detachably secured by one end thereof to adjacent opposite ends of said drawbar members of said center section, said hitch members converging to a common apex and forming a hitch point for a source of pulling power, means for connecting a plurality of first soil-treating implements behind said drawbar members, a superposed frame above each of said drawbar members and extending rearwardly therefrom, post members secured to said drawbar members and extending upwardly therefrom to adjacent the front sides of said superposed frames and being connected thereto, castor wheel means extending from said frames to support the front sides of said superposed frames and said drawbar members, means on said superposed frames to raise and lower said first soil-treating implements relative to the ground, and means mounting second soil-treating members on the rear sides of said superposed frames, said means mounting said second soil-treating implements including horizontal arm clamped to the rear of said superposed frame for longitudinal adjustment therealong, a vertical spindle journaled for rotation in the distal end of said arm, an intimate mounting yoke, a horizontal spindle upon which said yoke is mounted for movement therearound, and means mounting said horizontal spindle to the lower end of said vertical spindle for hinging action thereby mounting said yoke and said second soil-treating implements for movement around a vertical axis, a first horizontal axis and a second horizontal axis at right angles to said first horizontal axis, said means mounting said horizontal spindle to said vertical spindle including a pair of offset members secured to and extending downwardly from said horizontal spindle, said members being pivotally secured to the lower end of said vertical spindle, one end of said horizontal spindle abutting against said vertical spindle vertically above said pivotal securement thereby limiting the hinging action of said yoke in the upward direction.

10. The assembly according to claim 9 in which said means to raise and lower said first soil-treating implements relative to the ground includes a rockshaft journaled for rotation on said superposed frame and extending parallel to said implement drawbar members, an hydraulic piston and cylinder assembly operatively connected between said rockshaft and the superposed frame of said center section, implement lift arms secured to and extending from said rockshaft and flexible means connecting said first soil-treating implement to the distal ends of said lift arms.

11. The assembly according to claim 9 in which said superposed frames are substantially rectangular when viewed in plan, said second soil-treating implement being mounted on the rear frame members of said rectangular frames and supporting said superposed frames at the rear thereof.

12. The assembly according to claim 10 in which said superposed frames are substantially rectangular when viewed in plan, said second soil-treating implement being mounted on the rear frame members of said rectangular frames and supporting said superposed frames at the rear thereof.

13. The assembly according to claim 9 in which said means to connect said wing sections to said center sections includes link plates secured to the ends of the front and rear sides of said superposed frame of said center section and extending upwardly and outwardly therefrom, corresponding link plates secured to the ends of the front and rear sides of the superposed frames of said wing sections and extending outwardly and upwardly therefrom, and pivot pin means connecting corresponding pairs of link plates together in a plane above the plane of said superposed frames, the spaces between adjacent drawbar members being staggered with respect to said pivot pin means to avoid engagement of the adjacent ends of said members.

14. The assembly according to claim 10 in which said means to connect said wing sections to said center sections includes link plates secured to the ends of the front and rear sides of said superposed frame of said center section and extending upwardly and outwardly therefrom, corresponding link plates secured to the ends of the front and rear sides of the superposed frames of said wing sections and extending outwardly and upwardly therefrom, and pivot pin means connecting corresponding pairs of link plates together in a plane above the plane of said superposed frames, the spaces between adjacent drawbar members being staggered with respect to said pivot pin means to avoid engagement of the adjacent ends of said members.

15. The assembly according to claim 11 in which said means to connect said wing sections to said center sections includes link plates secured to the ends of the front and rear sides of said superposed frame of said center section and extending upwardly and outwardly therefrom, corresponding link plates secured to the ends of the front and rear sides of the superposed frames of said wing sections and extending outwardly and upwardly therefrom, and pivot pin means connecting corresponding pairs of link plates together in a plane above the plane of said superposed frames, the spaces between adjacent drawbar members being staggered with respect to said pivot pin means to avoid engagement of the adjacent ends of said members.

16. The assembly according to claim 12 in which said means to connect said wing sections to said center sections includes link plates secured to the ends of the front and rear sides of said superposed frame of said center section and extending upwardly and outwardly therefrom, corresponding link plates secured to the ends of the front and rear sides of the superposed frame of said wing sections and extending outwardly and upwardly therefrom, and pivot pin means connecting corresponding pairs of link plates together in a plane above the plane of said superposed frames, the spaces between adjacent drawbar members being staggered with respect to said pivot pin means to avoid engagement of the adjacent ends of said members.

17. The assembly according to claim 9 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and a pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.

18. The assembly according to claim 10 in which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and a pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.

19. The assembly according to claim 11 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and a pin lowered slot also in the walls of said tube, the angulated end of said pin being selectively engageable either of said slots, the lower end of said pin engaging an aperture in said plate when said pin engages the pin lowered slot thereby locking said plate and hence said vertical spindle against rotation.

20. The assembly according to claim 12 which includes means to lock said castor wheel means in transport position when desired, said castor wheel means including a wheel, wheel-mounting means, a vertical spindle journaling said castor wheel means to said frame and a vertical bearing housing for said spindle, said means to lock said castor wheel means including a plate secured to said vertical spindle below said bearing housing, a tube secured to one side of said housing, an angulated pin vertically movable in said tube, a pin raised slot in the walls of said tube and a pin lowered slot also in the walls of said tube, the angulated end of said pin being selectively engageable in either of said slots, the lower end of said pin engaging an aperture in said plate when said pin engages the pin lowered slot thereby locking said plate and hence said vertical spindle against rotation.